United States Patent [19]

Arai

[11] 4,034,385
[45] July 5, 1977

[54] CAMERA WITH A SINGLE AUTOMATICALLY OR MANUALLY OPERABLE MEMORY SWITCH

[75] Inventor: Akihiro Arai, Tokyo, Japan

[73] Assignee: Asahi Kogaku Kogyo Kabushiki Kaisha, Japan

[22] Filed: May 3, 1976

[21] Appl. No.: 682,389

[30] Foreign Application Priority Data

May 15, 1975 Japan .................. 50-63715[U]

[52] U.S. Cl. .................. 354/38; 354/51; 354/156
[51] Int. Cl.² .................. G03B 7/08; G03B 19/12
[58] Field of Search .............. 354/23 R, 26, 36, 38, 354/48, 50, 51, 60 R, 156, 226, 267

[56] References Cited

UNITED STATES PATENTS 3,887,932  6/1975  Uno et al. .................. 354/156
3,906,517  9/1975  Nomura et al. .................. 354/38 X Primary Examiner—L. T. Hix
Assistant Examiner—William B. Perkey
Attorney, Agent, or Firm—Steinberg & Blake

[57] ABSTRACT

A camera which has only a single memory switch capable of being either automatically or manually operated. This single memory switch is connected between a memory capacitor and a light-responsive structure for storing in the memory capacitor at least part of the information required in connection with film exposure. A switch-control structure cooperates with the single switch for controlling the latter to have either an open or a closed position, the switch having its open position when the information from the light-responsive structure is stored in the capacitor. This switch-control structure is capable of being operated either by an automatic structure or a manually operable structure in such a way that either the operator can control the switch to have its open position or the switch can have its open position in response to automatic operation.

11 Claims, 5 Drawing Figures

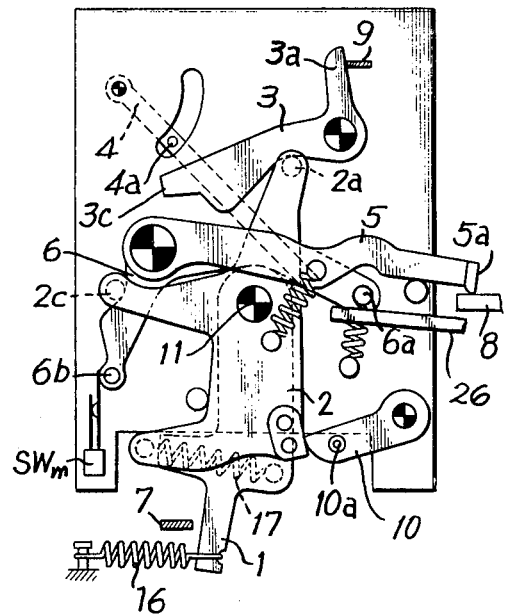
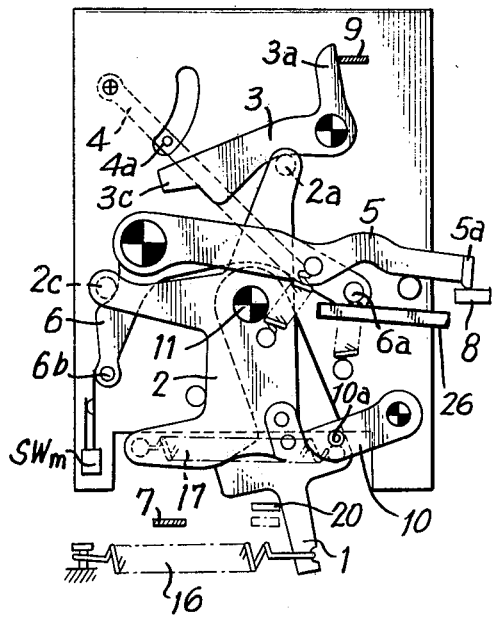

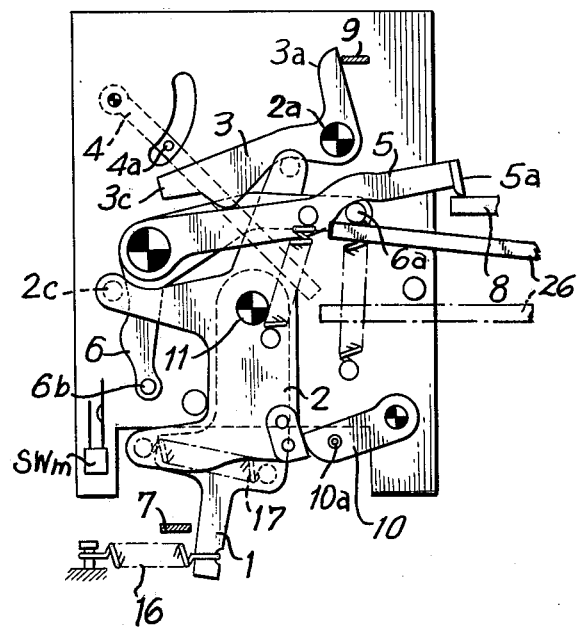

CAMERA WITH A SINGLE AUTOMATICALLY OR MANUALLY OPERABLE MEMORY SWITCH

BACKGROUND OF THE INVENTION

The present invention relates to cameras.

The present invention relates to single lens reflex cameras of the type where light is measured after travelling through the objective of the camera.

Such internal light measurement is advantageous as compared with external light measurement because on the one hand the deviation of the actual photographing angle of the objective from the angle of exposure which would be constant for an external light-measuring system can be eliminated, while on the other hand it is easy to determine a proper exposure multiple in order to compensate for a variation of the F-number due to an increase in advance of the objective for photographing at a short distance as well as due to a reduction in light intensity which occurs due to use of a filter or an attachment lens.

For the above reasons, internal light-measuring systems known as TTL or through-the-lens systems, has dominated the field of photographic cameras, particularly of the single-lens reflex type and many photographic cameras which utilize such an internal exposure system in connection with automatic exposure controls have been recently proposed.

It is, however, required that the so-called TTL system store information with respect to the object to be photographed, this information being obtained immediately before a mirror of the camera swings up from a viewing position to an exposure position, inasmuch as the light which comes from the object which is to be photographed is prevented from reaching the light-measuring structure of the camera when the mirror is displaced beyond the optical axis of the objective so as to enable an exposure to be made.

Moreover, it is common to measure the light when the diaphragm provides a fully open aperture, so that under these conditions the information which is stored is obtained prior to regulation of the diaphragm to provide the aperture required for film exposure. The operations in connection with storing this information is usually effected in connection with operation of the diaphragm mechanism and the mirror mechanism in such a way that the information with respect to the object which is to be photographed is stored just prior to actual film exposure, these operations usually being carried out automatically.

However, under certain photographing conditions such as when compensation is made for back-lighting or counter light, or when a bulb exposure or a time exposure are made, with the mirror swung up to the exposure position, the information with respect to the object which is to be photographed must preliminarily be stored, and this latter operation must be carried out manually. Various mechanisms for achieving such manual memory operations have already been proposed. Such mechanisms conventionally provide for operations which are independent of the automatic memory operation which is operatively associated with the diaphragm-controlling mechanism and mirror-controlling mechanism. Where there is an automatic exposure control for controlling an electrically-operated shutter, for example, there have been provided two memory switches so that the information with respect to the object to be photographed may be converted into the corresponding electrical quantity and stored in a memory capacitor by one or the other of the switches, one of these switches being automatically operated and the other one being manually operated. Such structure has lead to complications and a reduction in accuracy as well as a reduction in the liability of the operation. Thus, a leakage current will occur at each of the switching regions resulting in a variation in the voltage of a memory capacitor and therefore producing an error in the stored value.

SUMMARY OF THE INVENTION

It is accordingly a primary objective of the present invention to provide a construction which will avoid the above drawbacks.

In particular, it is an object of the present invention to provide a construction according to which only a single switch need be provided for the memory operation, so that in this way the disadvantages with respect to the leakage current can be avoided.

Furthermore, it is an object of the present invention to provide a mechanism for memory operation which is extremely simple and at the same time highly accurate, while having the capability of unifying the input into the memory capacitor, whether this input is achieved automatically or manually.

According to the invention, a single lens reflex camera which has a mirror movable between a viewing position extending across an optical axis of the camera and an exposure position displaced beyond the optical axis, also includes a light-responsive means for providing an electrical quantity corresponding at least in part to the lighting conditions. A capacitor means is provided for storing this electrical quantity. According to the invention a single switch is connected between the light-responsive circuit means and the capacitor means for transmitting this quantity from the light-responsive circuit means to the capacitor means when the switch is in its closed position while placing the capacitor means in a condition storing the electrical quantity when the switch is in an open position. A switch-control means cooperates with the latter switch for controlling the latter switch to have one or the other of these positions. A pair of operating means cooperate with this switch-control means for operating the latter to have the single switch in its open position prior to movement of the mirror from its viewing to its exposure position. One of the pair of operating means is an automatic operating means for automatically operating the switch-control means to determine the position of the switch automatically, while the other of the pair of operating means is a manual operating means accessible to the operator of the camera for manipulation for manually determining the position of the switch.

BRIEF DESCRIPTION OF DRAWINGS

The invention is illustrated by way of example in the accompanying drawings which form part of this application and in which:

FIG. 1 is a schematic elevation of a camera mechanism according to the invention, with this mechanism being shown in FIG. 1 in its rest position;

FIG. 2 shows the position which the parts of FIG. 1 take when the shutter is cocked in preparation for making an exposure;

FIG. 3 illustrates how the structure of FIG. 2 operates when an exposure is made with the memory switch being automatically operated;

FIG. 4 shows how the structure of FIG. 1 is manually operated to store information in a memory capacitor; and FIG. 5 is a schematic diagram of the electrical circuitry of the camera.

DESCRIPTION OF PREFERRED EMBODIMENTS

Referring first to FIG. 5, which schematically illustrates one possible embodiment of an automatic exposure control circuit, it will be seen that the illustrated circuit includes a power source E as well as power switch SW$p$ of a well known type which is adapted to be closed in connection with depression of the shutter-tripping plunger of the camera. Thus, during the initial part of the movement of the shutter-tripping plunger of the camera the switch SW$p$ will be closed so that energy will be taken from the battery E. The illustrated automatic exposure control circuit of FIG. 5 is thus energized upon closing of the switch SW$p$. This will result in operation of a light-responsive circuit means 30 in the form of a suitable photometric circuit which responds to the intensity of light at the object to be photographed so as to convert this light intensity into an electrical quantity serving as information to be utilized in connection with film exposure, this electrical quantity being provided as a corresponding terminal voltage at the memory capacitor C. A switch SW$_m$ is connected between the light-responsive circuit means 30 and the capacitor means C so as to transmit the electrical quantity from the means 30 to the memory means C when the switch SW$_m$ is closed. This switch SW$_m$ is open in connection with operation of a diaphragm mechanism of the camera, for example, so that the information with respect to the object which is to be photographed is stored at the memory capacitory means C in the form of a corresponding electrical quantity. After operation of the diaphragm mechanism and the mirror mechanism, in order to swing the mirror up from its viewing position to its exposure position, a timing switch SW$_T$, shown in FIG. 5, is opened simultaneously with opening of the shutter, whereupon a timing and exposure control circuit 31 automatically operates according to the value stored in the memory capacitor C, so as to complete the exposure. In a well known manner after the automatically determined exposure time has elapsed an electromagnet M$g$ is operated by the automatic control circuit 31 so as to bring about closing of the shutter as, for example, by releasing the trailing curtain of the shutter to run down and close the shutter so as to terminate the exposure.

Various automatic exposure control circuits arranged basically as described above and shown in FIG. 5 have already been proposed, such circuits, however, having an additional memory switch for manual operation, this additional switch being provided in series with the illustrated memory switch SW$_m$. In this way the information with respect to the object which is to be photographed may be stored as a terminal voltage at the memory capacitor C also by externally operating such an additional memory switch. In this manner, however, a leakage current will occur at each switching region, and this leakage current results in a variation in the voltage stored by the memory capacitor C, so that an unavoidable error is introduced with respect to the stored value. Acccording to the present invention, however, such a leakage current is substantially reduced by providing only a single memory switch while unifying the input to the memory capacitor with an interlocked mechanism capable of operating the single switch SW$_m$ either manually or automatically.

FIGS. 1-4 illustrate one possible embodiment of an actual structure capable of achieving the objects of the present invention. Thus, it will be seen that the mechanism of FIGS. 1-4 includes a switch-control means 6 in the form of a lever of substantially L-shaped configuration which is pivotally supported on the wall illustrated in FIGS. 1-4 by way of a suitable pivot pin situated at the junction between the legs of the lever 6 which respectively extend substantially downwardly and substantially horizontally to the right from the pivot pin, as viewed in FIGS. 1-4. The illustrated structure also includes an automatic operating means 2 in the form of a driving lever supported on the wall shown in FIGS. 1-4 by way of a pivot pin 11, the lever 6 serving as a transmission member for transmitting movement between the driving lever 2 and a lever 5 which forms part of a diaphragm-control means. It will be seen that the lever 5 is supported for turning movement by the same pivot pin which carries the lever 6 with the lever 5 also extending substantially horizontally to the right from the pivot pin which carries the lever 5, this lever 5 being situated in front of the lever 6 as viewed in the drawings. The transmission of movement from the driving lever 2 to the lever 5 by way of the lever 6 is carried out with a certain delay inasmuch as the lever 6 will first be turned through a certain angle by the lever 2 before transmitting turning movement from the lever 2 to the lever 5.

The memory switch SW$_m$ of FIG. 5 is also shown in FIGS. 1-4. This memory switch is a normally open switch in the sense that when it is not acted upon by the switch-control means formed by the lever 6, the memory switch SW$_m$ will automatically assume an open position as illustrated in FIG. 3. The end 6$b$ of the lever 6 normally maintains the switch SW$_m$ closed, as illustrated in FIGS. 1, 2, and 4, while during the initial turning of the lever 6 in a counterclockwise direction the end 6$b$ at the lever 6 will move away from the SW$_m$ so that the latter will assume its open position shown in FIG. 3. Thus, during the initial delay in transmission of the drive from the lever 2 to the lever 5 by way of the lever 6, the latter will bring about opening of the memory switch SW$_m$, and thus the regulation of the diaphragm will be carried out with such a delay. During normal operations in connection with the release of the shutter so as to open the latter to make an exposure, the memory lever 6 and the diaphragm lever 5 are driven by way of the driving lever 2 so that as a result automatic memorization is effected. However, in a manner which is described below, it is also possible directly to turn the lever 6 with a manual operating means when the information with respect to the object to be photographed, namely the light intensity at the object to be photographed, must be stored in a special manual manner. The manner in which the mirror-operating mechanism operates is set forth in detail below.

The structure shown in FIGS. 1-4 includes a charging or cocking lever which is swingable on the same pin 11 which carries the driving lever 2 which forms part of the automatic operating means. When the shutter of the camera is cocked in preparation for making an exposure, a setting lever 7 moves to the right from the position shown in FIG. 1 first to the dot-dash line position indicated in FIG. 2 and then back to the position of FIG. 1, so that during this movement of the setting lever 7 to the right from the solid to the dot-dash line position of FIG. 2, the cocking lever 1 will be turned in a counterclockwise direction about the pivot 11, thus tensioning the spring 16. Upon cocking of the shutter, a member 20 which is connected to the trailing curtain thereof engages the lever 1, when the latter has the position shown in FIG. 2, so that this member 20 maintains the lever 1 in its cocked position with the spring 16 tensioned, until the trailing curtain is released to terminate an exposure. Thus, the spring 16 remains tensioned even after the setting lever 7 returns to its starting position.

A locking lever 10 normally has the position shown in FIG. 1 while a spring 17 is connected between the levers 1 and 2. Thus the locking lever 10 will prevent the lever 2 from turning while the spring 17 is also tensioned upon turning of the cocking lever 1 from the position of FIG. 1 to the position of FIG. 2. Thus the spring 17 is also tensioned when the parts are in the cocked position shown in FIG. 2. The locking lever 10 has a pin 10a projecting therefrom, and this pin 10a is acted upon by an unillustrated structure in connection with depression of the shutter-tripping plunger, so that through the pin 10a the locking lever 10 will be turned in a counterclockwise direction downwardly beyond the position shown in FIGS. 1 and 2, thus releasing the driving lever 2 to the force of the spring 17 which contracts to turn the lever 2 in a counterclockwise direction about the pin 11 from the position of FIG. 2 into the position of FIG. 3 while the lever 1 is held by the lever 20 in the position of FIG. 2 until the electromagnet Mg operates to release the trailing curtain. When the operator releases the shutter-tripping plunger, the lever 10 seeks to return back to the position of FIG. 1 as a result of the operation of an unillustrated spring, but such return of the locking lever 10 to the position of FIG. 1 is prevented because the lever 2 has become situated over the lever 10 as illustrated in FIG. 3, upon contraction of the spring 17.

The lever 2 is of a substantially Y-shaped configuration and has three arms one of which cooperates with the lever 10, another of which cooperates with the lever 6, and the third of which cooperates with the lever 3 of the mirror-operating mechanism. Thus, the arm of the lever 2 which extends substantially to the left from the pivot 11, as viewed in the drawings, carries at one end a projection 2c which is situated over a projecting portion at the left side of the downwardly extending leg of the L-shaped switch-controlling lever 6. As a result, when the lever 2 is turned by the spring 17, from position of FIG. 2 into the position of FIG. 3, the projection 2c acts on the lever 6 to turn the latter in a counterclockwise direction, in opposition to the force of a spring connected to a pin 6a which is fixed to and projects from the lever 6 at the end of its horizontal leg which is distant from the pivot which carries the lever 6. Thus the latter spring which is connected to the pin 6a will become tensioned while the lever 6 is turned by the pin 2c of the lever 2 so as to bring about opening of the switch $SW_m$. Thus, as was pointed out above, during the initial increment of turning of the lever 6 the end 6b thereof will turn away from the switch $SW_m$, thus opening this memory switch and causing the information with respect to the object which is to be photographed to be stored at the memory capacitor means C, as described above.

During the continued counterclockwise turning of the lever 6, the pin 6a thereof will engage the lower edge of the diaphragm-controlling lever 5 so as to turn the latter also in a counterclockwise direction about the same axis as the lever 6, and the end 5a of the lever 5 will move upwardly with respect to a lever 8 of the diaphragm-control mechanism so that this lever 8 is released from the depressing effect of the lever 5, and this movement of the lever 8 will result in a known way in the automatic stopping down of the diaphragm to the preselected exposure aperture which will be automatically provided for film exposure, while the diaphragm is maintained in its fully open position when the lever 5 has the position shown in FIGS. 1 and 2. It will be noted that a spring is interconnected between the levers 2 and 5 so as to provide on the diaphragm lever 8 the force which will maintain the diaphragm in its fully open position until the lever 5 is turned by the pin 6a so as to release the lever 8 and thus release the diaphragm to assume the preselected aperture which will be utilized during film exposure.

When the driving 2 turns from the position of FIG. 2 to the position of FIG. 3, the third arm of the lever 2 which carries at its end the projection 2a, engages with this projection the lower edge of a lever 3 of a mirror-operating mechanism. This lever 3 is also of a substantially L-shaped configuration, thus having the form of a bell crank in the same way as the lever 6. At the junction between its legs the lever 3 is supported for turning movement by a pivot carried by the wall which is shown in FIGS. 1-4. The configuration of the lower edge of the lever 3 is such that when the pin 2a turns with the lever 2 from the position of FIG. 2 into the position of FIG. 3, the lever 3 is turned in a clockwise direction so that the left free end 3c thereof will engage a pin 4a projecting from a frame which surrounds and carries the swingable mirror 4 supported for swinging movement about its upper edge region, as viewed in FIGS. 1-4. The pin 4a extends through a suitable slot in the wall which is shown in the drawings so as to be situated in the path of turning movement of the end 3c of the lever 3. Thus when the lever 3 is turned by the lever 2 from the position of FIG. 2 into the position of FIG. 3, the end 3c will engage the pin 4a so as to turn the mirror 4 from the inclined viewing position thereof, extending across the optical axis, as shown in FIG. 2, up to the substantially horizontal exposure position shown in FIG. 3 where the mirror 4 is situated above the optical axis. At the end of the swinging up of the mirror 4 an arm 3a of the lever 3 cooperates with a shutter-tripping element 9 to move the latter in order to release the leading curtain of the shutter, the trailing curtain being subsequently released, upon operation of the electromagnet Mg, as ponted out above. Thus, with the particular construction described above and shown in the drawings just before opening of the shutter the memory switch $SW_m$ will be opened, so as to store information at the capacitor means C, the diaphragm will be stopped down to the preselected aperture, and the mirror 4 will be swung up to its exposure position.

As was pointed out above, simultaneously with opening of the shutter the timing switch $SW_T$ is activated to start a timing operation in accordance with the electrical quantity stored in the memory capacitor C, and closing of the shutter is brought about by way of control of the electromagnet Mg, as was also pointed out above. Upon closing of the shutter, the member 20 will move in synchronism with the release of the trailing curtain to release the lever 1 so that the spring 16 will return the lever 1 to the position of FIG. 1, and now the locking lever 10 will return to the position of FIG. 1, and with the return of the lever 1 to its starting position the levers 2, 6, 5, and 3 also return to their starting positions shown in FIG. 1.

In accordance with the present invention, in addition to the structure described above, there is a manual operating means 26 forming a part of mechanism accessible to the operator at the exterior of the camera and available to the operator for manipulation to displace the member 26 shown in the drawings upwardly from the position of FIG. 1 to the position of FIG. 4. Thus this member 26 can be manually moved from the dot-dash line position of FIG. 4 to the solid line position. In the path of movement of the member 26 is located the pin 6a projecting from the lever 6, so that during this manual movement of the manual operating means 26, the latter will engage the pin 6a an turn the lever 6 to the position shown in FIG. 4, thus bringing about manual opening of the switch $SW_m$. Thus, during regulation of the diaphragm, on the other hand, irrespective of whether such regulation takes place before or after charging of the mirror mechanism, the pin 6a carried by the switch-control lever 6 is moved by the externally operated member 26 so that the memory switch $SW_m$ is opened by displacement of the end 6b of the lever 6 away from the switch during the initial turning of the lever 6, thus bringing about in a manual manner storage of information with respect to the object to be photographed at the memory capacitor C. After the initial increment of manual turning of the lever 6 to open the switch $SW_m$, the continued turning thereof will bring about turning of the lever 5 to achieve diaphragm regulation as set forth above and as is also shown in FIG. 4. Of course with the structure as shown in FIG. 4, the cocking lever 1 will be operated in the same way as described above in connection with FIGS. 1-3 and the driving lever 2 will also operate in the same way, so that operation of the mirror is brought about only automatically even if the switch $SW_m$ is initially opened manually. Of course at the end of an exposure with the manual control of the switch $SW_m$, the manual operating means 26 is returned to the position shown in FIGS. 1-3, and of course the remaining parts will return to their starting positions as set forth above.

Thus, with the above-described structure of the invention there is provided a memory mechanism for a single lens reflex camera of a construction which is simpler than has heretofore been provided and with a higher accuracy for the memory operation than can be achieved in similar mechanisms which are known.

It is to be understood that although the switch-control means formed by the lever 6 is arranged in the illustrated example so as to operate initially to control the switch $SW_m$ prior to control of the diaphragm it is also possible to provide a structure in accordance with the invention according to which the lever 6 will operate to open the switch $SW_m$ immediately prior to upward swinging of the mirror 4 from the position of FIG. 2 to the position of FIG. 3, even if this movement of the lever 6 to control the switch $SW_m$ so as to open the latter is required by the design of the camera to take place after regulation of the diaphragm. For example, with some cameras the design may be such that the diaphragm is stopped down, manually, for example, prior to film exposure, and the structure of the invention is equally operable with such a construction where diaphragm regulation takes place prior to opening of the memory switch. Thus, the manual operation of the memory switch may be achieved by a separate operation immediately before diaphragm regulation or immediately before upward movement of the mirror, after diaphragm regulation, depending upon the particular design of the camera.

What is claimed is:

1. In a single lens reflex camera having a mirror movable between a viewing position extending across an optical axis of the camera and an exposure position displaced beyond the optical axis, light-responsive circuit means for providing an electrical quantity corresponding at least in part to lighting conditions, capacitor means for storing said electrical quantity, a single switch connected between said light-responsive circuit means and said capacitor means for transmitting said quantity from said light-responsive circuit means to said capacitor means when said switch is in a closed position and for placing said capacitor means in a condition storing said electrical quantity when said switch is in an open position, switch-control means cooperating with said switch for controlling the latter to have one or the other of said positions, and a pair of operating means cooperating with said switch-control means for operating the latter to have the switch in its open position before the mirror moves from its viewing to its exposure position, one of said operating means being an automatic operating means for automatically operating said switch control means to determine the position of said switch automatically and the other of said operating means being a manual operating means accessible to the operator of the camera for manipulation for manually determining the position of said switch.

2. The combination of claim 1 and wherein a diaphragm-control means has a cooperative relationship with respect to said switch-control means according to which the latter operates said diaphragm-control means to control a diaphragm of the camera in a given time sequence with respect to control of said switch by said switch-control means.

3. The combination of claim 2 and wherein said switch-control means cooperates with said switch for controlling the latter to have said open position thereof prior to operating said diaphragm-control means.

4. The combination of claim 1 and wherein said automatic operating means cooperates with said mirror for moving the latter from said viewing to said exposure position thereof.

5. The combination of claim 1 and wherein said switch is a normally open switch capable of automatically assuming said open position when not acted upon by said switch-control means, the latter acting only to hold said switch in said closed position thereof.

6. The combination of claim 1 and wherein said switch-control means includes a lever turnable with respect to said switch by either one of said pair of operating means to have said switch in said open position thereof.

7. The combination of claim 6 and wherein said manual operating means has a portion movable along a predetermined path and said lever carrying a projection situated in said path to be engaged by said manual operating means.

8. The combination of claim 6 and wherein said automatic operating means includes a second lever having a projection for engaging and turning said first-mentioned lever.

9. The combination of claim 1 and wherein said switch is a normally open switch capable of having said open position thereof when not engaged by said switch-control means, the latter being in the form of a lever turnable away from said switch to enable the latter to assume said open position thereof, said automatic operating means including a second lever having a projection for engaging said first-mentioned lever to turn the latter upon turning of said second lever for having said switch assume said open position thereof, a mirror-operating mechanism also being acted upon by said second lever for moving said mirror from said viewing to said exposure position thereof, and said first-mentioned lever having a projection while said manual operating means has a portion movable along a predetermined path in which the latter projection is located for engaging the latter projection to turn said first-mentioned lever manually to have said switch assume said open position thereof.

10. The combination of claim 9 and wherein a diaphragm-control means for regulating a diaphragm of the camera is also operated on by said first-mentioned lever.

11. The combination of claim 10 and wherein said first-mentioned lever operates on said diaphragm-control means subsequently to turning away from said switch so that the latter assumes said open position prior to regulation of the diaphragm by said diaphragm-control. means.

* * * * *